United States Patent [19]
Doi et al.

[11] 3,945,713
[45] Mar. 23, 1976

[54] IMAGE ROTATING OPTICAL SYSTEM

[75] Inventors: Yoshikazu Doi; Toshiro Kishikawa, both of Omiya; Hiroshi Yamada, Tokyo, all of Japan

[73] Assignee: Fuji Photo Optical Co., Ltd., Omiya, Japan

[22] Filed: July 29, 1974

[21] Appl. No.: 492,880

[30] Foreign Application Priority Data
July 28, 1973   Japan................................ 48-85324

[52] U.S. Cl. ........................ 350/54; 350/7; 350/45; 350/51
[51] Int. Cl.²......................................... G02B 23/02
[58] Field of Search................... 350/54, 45, 48–53, 350/22–24, 6, 7

[56] References Cited
UNITED STATES PATENTS

| | | |
|---|---|---|
| 829,121 | 8/1906 | Neumayer et al. ................... 350/23 |
| 1,098,905 | 6/1914 | Jacob et al. ........................... 350/23 |
| 2,505,819 | 5/1950 | Wrigley ............................. 350/45 X |
| 2,569,010 | 9/1951 | Kuzmitz et al. .................... 350/54 X |
| 3,418,034 | 12/1968 | Ambrose ............................ 350/51 X |
| 3,434,777 | 3/1969 | Santirocco et al. ................ 350/50 X |
| 3,459,465 | 8/1969 | Rosin et al. ........................... 350/50 |
| 3,558,212 | 1/1971 | Ritchie ............................... 350/23 X |
| 3,655,260 | 4/1972 | Bartucci et al. ...................... 350/45 |

*Primary Examiner*—David H. Rubin

[57] ABSTRACT

In an optical system including an objective lens to form an image on a focusing plane and a relay lens system to carry the image to another focusing plane, an image rotating prism is inserted in the relay lens system and a field lens is provided between the objective lens and the relay lens. The pupil of the relay lens system is positioned at the center of the optical path of the prism by properly selecting the power of the field lens.

7 Claims, 5 Drawing Figures

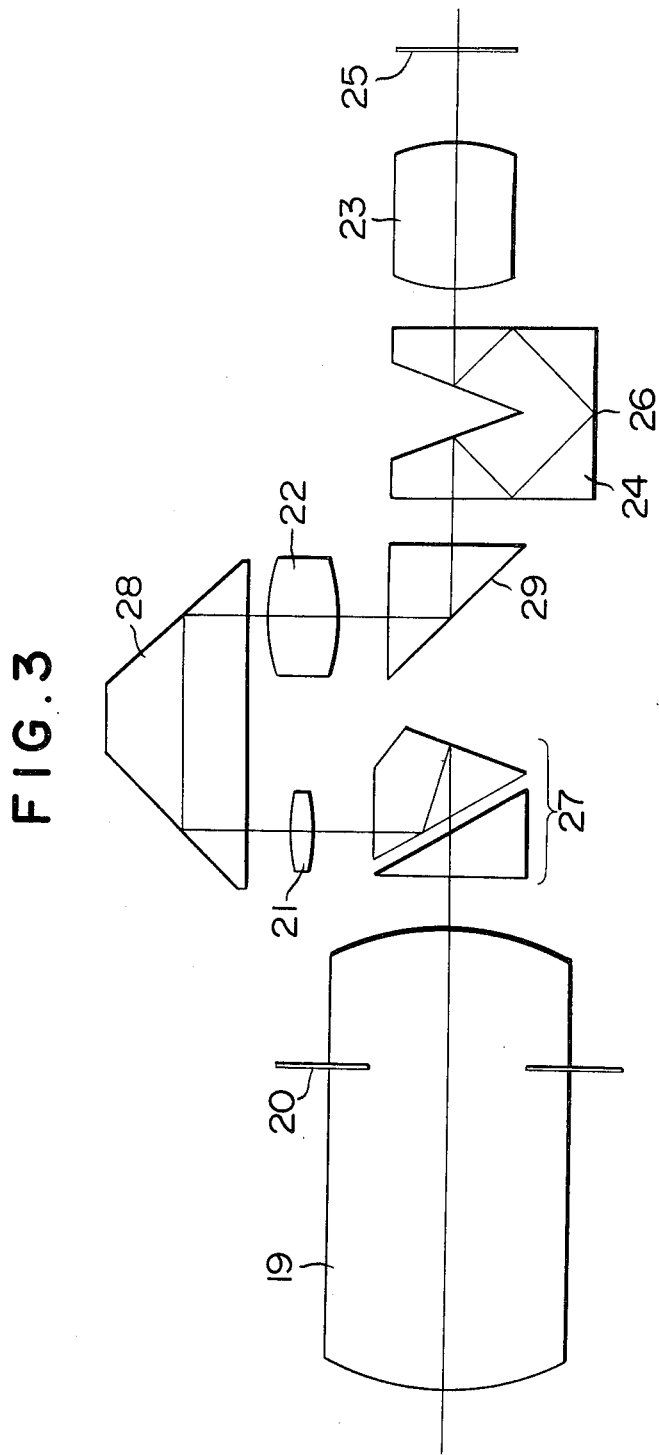

IMAGE ROTATING OPTICAL SYSTEM

BACKGROUND OF THE INVENTION

1. Field of the Invention

This invention relates to an optical system for rotating an image, and more particularly to an optical system using an image rotating prism for rotating an image in a taking lens system for cameras such as television cameras, motion picture cameras and photographic cameras. The image rotating optical system in accordance with this invention is also applicable to various other types of optical instruments.

2. Description of the Prior Art

It has been well known in the art to rotate an image in an image forming optical system using an image rotating prism. The image rotating prism has an odd number of reflecting faces, and the incident light and the exit light thereof have a common optical axis. The image formed by the light passing through the rotating prism is rotated about the optical axis thereof by rotating the prism thereabout.

This kind of image rotating prism is usually located before an objective lens. However, the image rotating prism located before the objective lens cannot sufficiently cover the visual field of the objective lens, since the objective lens usually has a wide visual field and the entrance face of the image rotating prism cannot be made so large in comparison with the effective optical path length of the prism. If the entrance face of the prism be made so large as to cover the visual field of the prism, the whole size of the prism would be impractically large.

The above described drawbacks of the image rotating prism located in front of the objective lens become far more serious when the objective lens is a zoom lens which has a front lens component of large diameter with a variable visual field angle and has the entrance pupil deep in the lens system.

It is obvious that the above described drawbacks of the conventional image rotating prism are based on the fact that the aperture of the objective lens is located outside the prism. The entrance face of the prism, therefore, can be made small if the aperture of the objective lens is brought into the prism. Theoretically, the size of the entrance face of the prism and the optical path length of the prism can be made smallest by locating the aperture of the objective lens at the center of the prism. It is impossible, however, in a practical sense to place the aperture of the objective lens in the optical path of the image rotating prism. Further, the size of the prism inevitably becomes large in order to widen the angle of the visual field of the prism.

SUMMARY OF THE INVENTION

In light of the foregoing observations and description of the conventional image rotating prism, the primary object of the present invention is to provide an optical system including an image rotating prism which covers the whole visual field of an objective lens even if the objective lens is a zoom lens having a variable visual field.

Another object of the present invention is to provide an optical system for rotating an image in an optical system using an image rotating prism which is extremely small in size and completely covers the visual field of the objective lens.

In order to accomplish the above described objects of the present invention, the visual field of the image rotating prism in accordance with this invention is made small regardless of the angle of the visual field of the objective lens by use of a relay lens system together with the prism. Further, the pupil of the relay lens system which is optically conjugate with the aperture of the objective lens is positioned at the center of the optical path of the image rotating prism so that the optical system operates as if there were an aperture at the center of the prism.

In accordance with the present invention, an image rotating prism is inserted in a relay lens system used together with the objective lens, and a field lens is provided between the objective lens and the relay lens system and the power thereof is properly selected so that the pupil of the relay lens system may be located at the center of the optical path of the image rotating prism. Consequently, the size of the image rotating prism is made extremely small and the image forming optical system including the image rotating prism is made compact in size.

BRIEF DESCRIPTION OF THE DRAWING

FIG. 3 is a longitudinal view showing a preferred embodiment of the present invention.

PREFERRED EMBODIMENTS OF THE INVENTION

Figure 1:
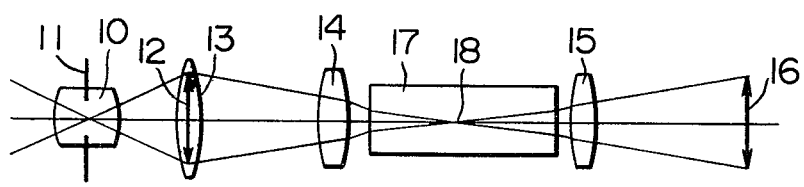
FIG. 1 is a longitudinal view showing the basic construction of the optical system in accordance with an embodiment of the present invention.
Figure 2A:
FIGS. 2A, 2B and 2C are longitudinal views showing some examples of image rotating prisms which can be used in the optical system of the present invention.
Figure 2B:
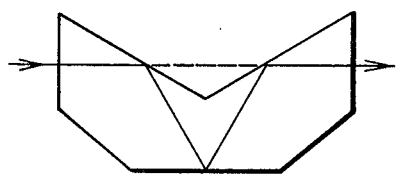
Figure 2C:
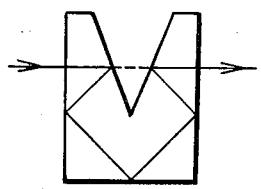

Referring to FIG. 1 which shows an embodiment of the present invention, an objective lens 10 having an aperture 11 focuses an image 12 on a first focusing plane. A field lens 13 is located on the focusing plane to converge the light from the objective lens 10. The power of the field lens 13 is so selected that the light exiting from the field lens 13 may be received by a front lens 14 of a relay lens system. The relay lens system comprises the front lens 14 and a rear lens 15, and the image 12 focused by the objective lens 10 is carried to the final focusing plane 16 thereby. An image rotating prism 17 is located between the front and the rear lenses 14 and 15 of the relay lens system. Since the field lens 13 is used only for converging the light from the objective lens, the power thereof does not affect the position of the finally focused image. The power of the field lens 13 is so selected that the pupil 18 of the relay lens system conjugate with the aperture 11 of the objective lens 10 is located at the center of the optical path of the image rotating prism 17. As for the image rotating prism 17 which is diagramatically illustrated in FIG. 1, various types as shown in FIGS. 2A, 2B and 2C are known in the art and can be employed in the optical system in accordance with the present invention. Since the pupil 18 of the relay lens system is controlled to be at the center of the optical path thereof, the entrance face of the image rotating prism 17 and accordingly the exit face thereof can be made small in size, and consequently, the prism itself can be made extremely compact in size. It will be noted that the image 12 formed on the first focusing plane by the objective lens 10 can be carried to the final focusing plane 16 as it is even if the visual field covered by the relay lens system is not so large by the relay lens system by properly selecting the focal length of the lenses 14 and 15. The pupil 18 of the relay lens system is kept to be at a predetermined fixed position even if the objective lens 10 is changed to a lens having a different visual field or to a zoom lens having a variable visual field just by changing the field lens 13 to another field lens of different focal length in accordance with the change in position of the exit pupil of the taking lens.

In accordance with the optical system as described hereinabove, an image focused by an objective lens having a wide visual field can be rotated by use of a small image rotating prism. The above described optical system in accordance with an embodiment of the present invention, however, has a disadvantage that the finally obtained image formed on the final focusing plane 16 is inverted with respect to the image formed only by the objective lens. Further, the optical system as described above is disadvantageous in that the total length thereof is long.

The foregoing drawbacks inherent in the above described embodiment shown in FIG. 1 are eliminated in the following preferred embodiment of this invention as described hereinbelow and illustrated in FIG. 3.

Referring to FIG. 3, an objective lens 19 such as a zoom lens having an aperture 20 focuses an image 25 on the final focusing plane through a field lens 21 and relay lenses 22 and 23. Between the relay lenses 22 and 23 is provided an image rotating prism 24 and a total reflection prism 29. As shown in FIG. 3, a prism system 27 for reflecting the light from the objective lens 19 at right angle is interposed between the field lens 21 and the objective lens 19. A Porro prism 28 is provided between the field lens 21 and the front relay lens 22 to return the light from the field lens 21 coming at right angle from the optical axis of the light exiting from the objective lens 19 back to the total reflection prism 29 located on the extension of the optical axis of the objective lens 19. The total reflection prism 29 reflects the light from the front relay lens 22 in the direction of the optical axis of the light exiting from the objective lens 19. Similarly to the above described first embodiment shown in FIG. 1, the pupil of the relay lens system conjugate with the aperture 20 is positioned at the center 26 of the optical path of the image rotating prism 24 by properly selecting the focal length of the field lens 21.

In accordance with the above described preferred embodiment shown in FIG. 3 in which additional prisms 27, 28 and 29 having an odd number of reflecting faces in total are employed to make the total number of reflections of the whole optical system including the image rotating prism 24 even, the image 25 finally obtained by the whole optical system in not inverted. Further, as apparently shown in FIG. 3, the total length of the optical system is shortened by use of the additional prisms 27, 28 and 29.

We claim:
1. In an optical system including an objective lens to form an image on a first focusing plane and a relay lens system comprising at least a front lens and a rear lens for carrying the image focused on said first focusing plane to a second focusing plane, an image rotating optical system comprising, an image rotating prism system having an odd number of reflecting faces in total for rotating an image formed with the light passing therethrough by the rotation thereof around the optical axis of said light, said image rotating prism being located between said front lens and said rear lens of the relay lens system, and a field lens located on said first focusing plane, the focal length of said field lens and said front lens of the relay lens system being selected to position the pupil of the relay lens system conjugate with the aperture of the objective lens at substantially the center of the optical path of said image rotating prism.

2. An image rotating optical system as defined in claim 1 wherein said image rotating prism system comprises a first prism having an even number of reflecting faces and a second prism having an odd number of reflecting faces.

3. An image rotating optical system as defined in claim 1 wherein a first light reflecting means is provided in the optical axis of the light exiting from the objective lens for deflecting the light from the objective lens substantially at the right angle with respect to the optical axis, a second light reflecting means is provided in the optical path of the light reflected by the first light reflecting means for reflecting the light from the first light reflecting means back to the optical axis of the objective lens, and a third light reflecting means is provided in the optical path of the light reflected by the second light reflecting means for reflecting the light from the second light reflecting means substantially at right angle in the direction of the optical axis of the objective lens, said first, second and third light reflecting means having an odd number of reflecting faces in total.

4. An image rotating optical system as defined in claim 3 wherein said first light reflecting means is a prism means provided between the objective lens and the field lens, said second light reflecting means is a prism means provided between the field lens and the front lens of the relay lens system, and said third light reflecting means is a prism means provided between the front lens of the relay lens system and the image rotating prism.

5. An image rotating optical system as defined in claim 4 wherein said second light reflecting means is a Porro prism.

6. An image rotating optical system as defined in claim 4 wherein said first light reflecting means is a prism means having an even number of reflecting faces and said third light reflecting means is a prism having an odd number of reflecting faces.

7. An image rotating optical system as defined in claim 6 wherein said first light reflecting means is a prism means having an odd number of reflecting faces and said third light reflecting means is a prism having an even number of reflecting faces.

* * * * *